United States Patent [19]

Tänzler

[11] 3,957,163
[45] May 18, 1976

[54] METHOD AND APPARATUS FOR STOCKING STOCK IN LAYERS
[75] Inventor: Hans-Ulrich Tänzler, Dusseldorf, Germany
[73] Assignee: Schloemann Aktiengesellschaft, Dusseldorf, Germany
[22] Filed: June 25, 1973
[21] Appl. No.: 373,302

[30] Foreign Application Priority Data
June 23, 1972  Germany............................ 2230715

[52] U.S. Cl............................ 214/6.5; 198/34;
 198/285; 214/1 QG; 214/6 FS
[51] Int. Cl.².......................................... B65G 57/04
[58] Field of Search................. 214/6 FS, 6 N, 6.5,
 214/1 Q, 1 QG; 198/34, 237, 282, 283, 285

[56] References Cited
UNITED STATES PATENTS

| | | | |
|---|---|---|---|
| 2,559,460 | 7/1951 | Peterson............................ | 214/6 FS |
| 2,780,340 | 2/1957 | Hynson............................ | 214/6 P X |
| 2,840,223 | 6/1958 | Schoppee............................ | 198/34 |
| 3,251,452 | 5/1966 | Conway et al....................... | 198/34 |
| 3,347,397 | 10/1967 | Hein................................. | 214/6 FS |
| 3,749,256 | 7/1973 | Hill et al........................... | 214/6 FS X |

FOREIGN PATENTS OR APPLICATIONS

| | | | |
|---|---|---|---|
| 1,182,911 | 1/1959 | France.............................. | 214/6.5 |
| 1,183,020 | 12/1964 | Germany.......................... | 214/6 FS |
| 31,218 | 9/1964 | Germany.......................... | 214/6 FS |

Primary Examiner—Albert J. Makay
Assistant Examiner—L. J. Paperner
Attorney, Agent, or Firm—Holman & Stern

[57] ABSTRACT

In order to simplify the apparatus and increase throughputs, sections are stacked by delivering the sections transversely to their length, separating them from one another, turning them over individually if desired and forming them into groups, all the sections in one group either being turned-over or not turned-over, the groups then being stacked in superposed layers by a single transfer device which lifts each group up and puts the group down on a stack.

9 Claims, 13 Drawing Figures

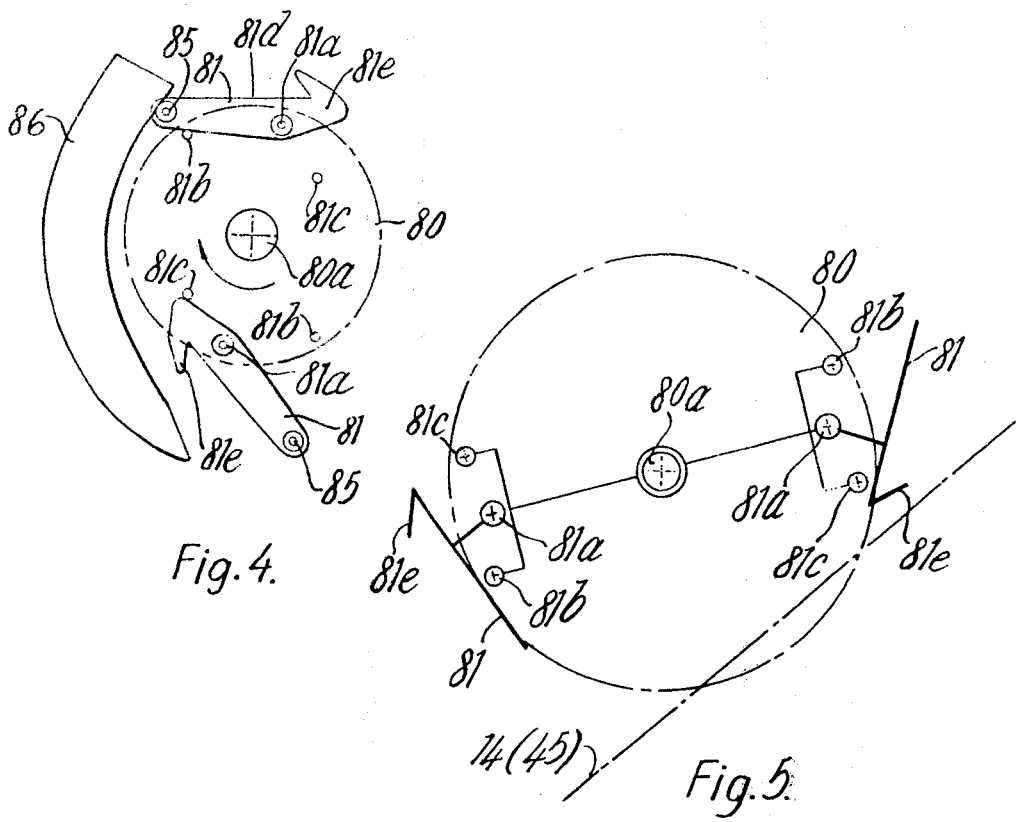
Fig. 4.
Fig. 5.
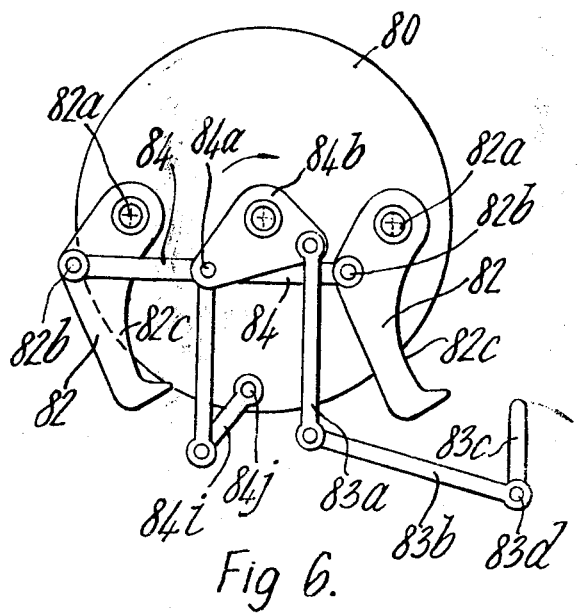
Fig 6.

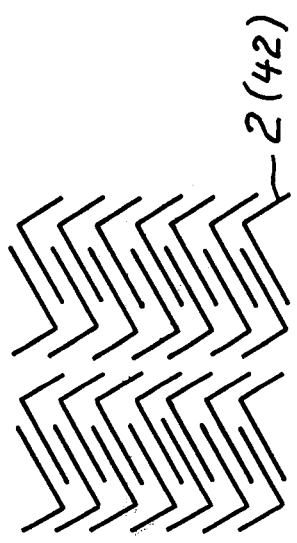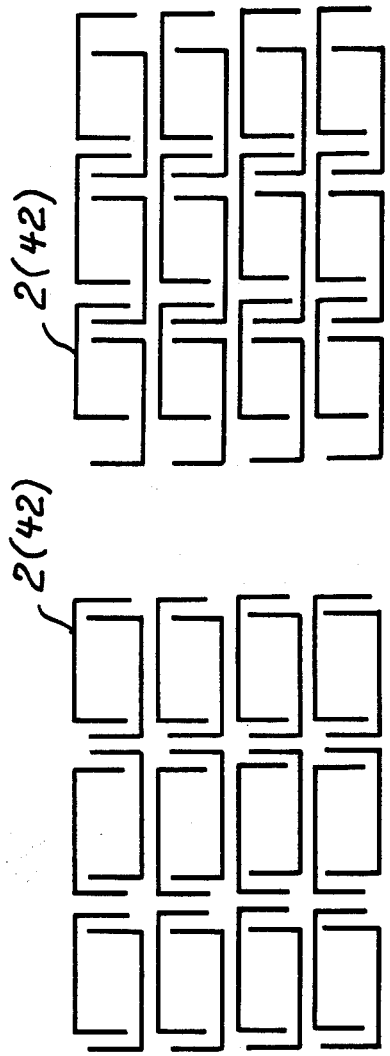

METHOD AND APPARATUS FOR STOCKING STOCK IN LAYERS

BACKGROUND OF THE INVENTION

The invention relates to a method and apparatus for mechanically stacking sectioned bar stock (hereafter referred to as sections) in layers, such sections arriving in groups or even separately and being optionally turned over or not turned over for further delivery and stacking. German Patent Specification No. 1,556,235 discloses a system for stacking sections in which the entire operating sequence from the infeed of the sections to stacking takes place completely automatically. In this system, the sections may be supplied in any desired sequence. The sections are separated from one another (individualized) and, as required, are individually and successively turned over and are subsequently individually stacked. Accordingly, in addition to performing a vertical lifting motion, the stacking table must be traversed in the horizontal plane by one section pitch after each section has been deposited. The construction and control of the stacking table is therefore very expensive. In one embodiment, each section is individually stacked by means of lowerable hoisting magnets with strippers; a substantial amount of time would be required for transferring each section to the stacking table because the stacking table must remain stationary for a substantial part of this time.

In order to achieve a shorter delivery time, in another embodiment of the same Patent Specification, the sections are ejected by stripping from a stationary permanent magnet. Ejection from a certain height however readily causes damage and is hardly suitable for sections of large cross-section.

German Patent Specification No. 1,198,287 discloses a stacking device in which the sections may be delivered unturned as well as turned-over. In this device, stacking magnets are pivotably supported on arms which are vertically and horizontally movable. To stack an unturned layer, the stacking magnets are lowered from above on to the sections, which lie on a feeder conveyor, and after energising the stacking magnets, the sections are raised, are moved over the stacking table and are lowered. To stack a turned-over layer, the stacking magnets are rotated through 180° about a horizontal axis, and are lowered below the feeder conveyor plane. A group of sections is then moved over the stacking magnets and when these are raised, the sections are also raised from the feeder conveyor, after which the stacking magnets are rotated back, moved over the stacking table and lowered. These three different movements require an expensive construction. Moreover, a very complex control system is required because of the different movements which the stacking magnets perform when the layer of sections is turned over and when the layer is not turned over. Furthermore, the amount of time required for each operating cycle is very large because of the series of successive movements, and therefore a device of this kind is not able to achieve a large rate of throughput.

THE INVENTION

In accordance with the invention, counted numbers of sections are individually and successively assembled into groups of parallel sections at a predetermined distance from each other, optionally turned over or un-turned, and the groups are stacked on top of each other in layers by a single overhead transfer conveyor device.

A method of this kind can be performed in reliable apparatus of simple construction, facilitates a very high throughput of stacked material, and permits nested stacking of the sections as well as stacking thereof in individual columns. It also enables many different cross-sectional shapes and sizes to be stacked. The individual sections can also be automatically turned over and the groups of sections stacked at a rate matched to the rate of operation of the apparatus as a whole. Turning over each separate section (i.e. turning the sections over before they have been assembled into groups) enables the sections to be turned over while remaining nearly in the conveying plane and this can avoid operational difficulties involved in selectively turning groups over by lifting and depositing, and can be particularly save time and thus increase throughput. A further constructional advantage is that the groups of sections, whether turned over or not, can be transferred to the stacking table by a single conveying means, i.e., a single transfer or stacking device, which either turns over all the groups or does not turn over any of the groups. The apparatus can be fully mechanized and automated.

BRIEF DESCRIPTION OF THE DRAWINGS

Three embodiments of apparatus in accordance with the invention are illustrated, by way of example, in the accompanying drawings, in which:

FIG. 4 is a side elevation of the turnover device of FIG. 3, parts being omitted for clarity;

FIG. 5 is a schematic side elevation showing the operation of the turnover device, of FIG. 3, parts being omitted for clarity;

FIG. 6 is a side elevation of the turnover device of FIG. 3, showing its use as a transfer device without turning over, parts being omitted for clarity;

FIGS. 10, 11 and 12 show different ways of forming the sections into stacks;

DESCRIPTION OF THE FIRST PREFERRED EMBODIMENT

Figure 1:
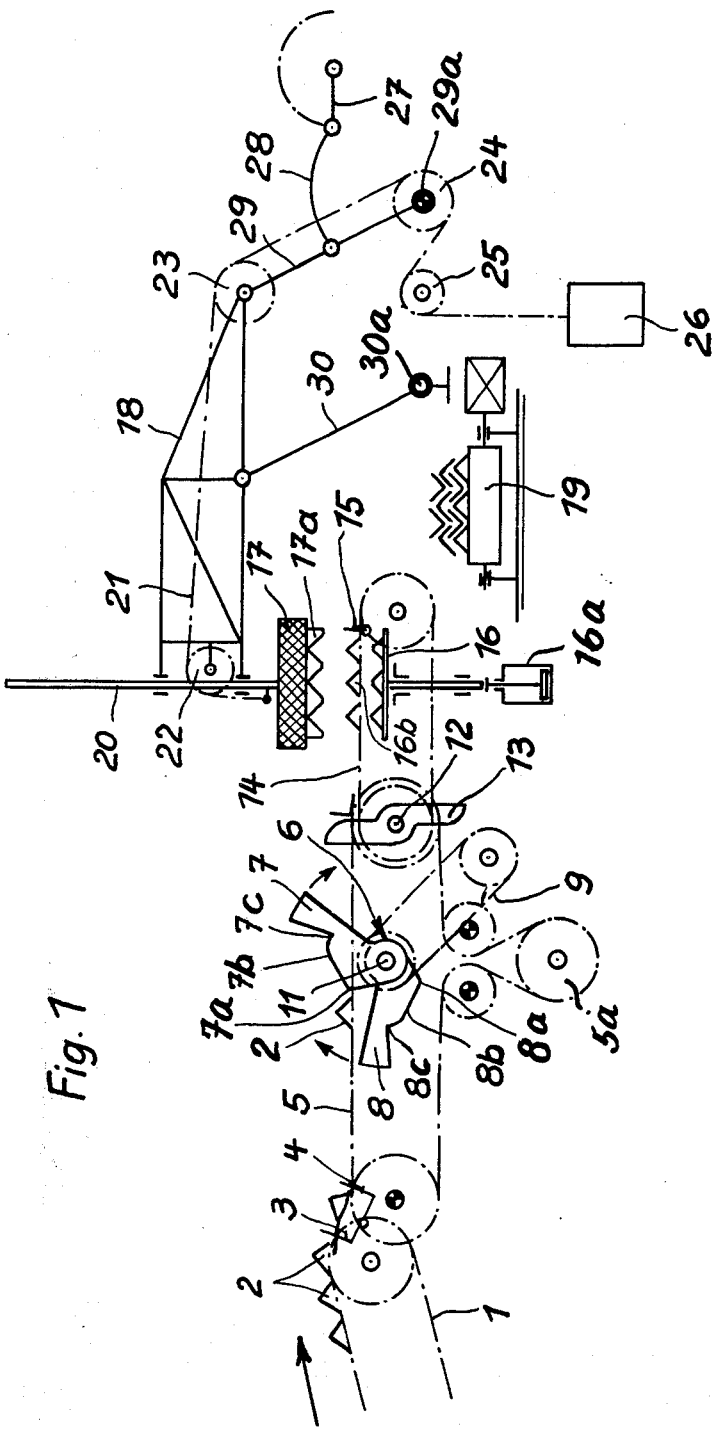
FIG. 1 is a schematic side elevation of a first embodiment of the invention.

In FIG. 1, a chain conveyor 1 supplies sections 2, for example angle sections, channel sections or I-sections. The sections are transferred to a second chain conveyor 5 (having a tensioning device 5a) via an individualizing device, which is only shown schematically in FIG. 1 — an embodiment of a suitable individualizing device is described below with reference to FIG. 3; the individualizing device comprises two transverse stops in the form of fingers 3, 4 which are spaced along the length of the sections (i.e., across the width of the conveyor 5), and are alternately raised and lowered into and out of the conveying plane. The second chain conveyor 5 supplies the sections separately (individually) to a turnover device 6 at the same rate as that of the operation of the individualizing device, which rate is matched to the rate of operation of the turnover device 6.

The turnover device 6 comprises sets of two identical rotary arms 7, 8 which are rotatable independently of each other, the arms 7 being journalled on but not fixed to a shaft 11 and driven by a chain drive 9. The sets of arms 7, 8 will be spaced along the length of the sections, as appropriate. The arms 8 are fixed to the shaft 11, which is the drive shaft for the arm 8. The shaft 11 can be driven by another chain drive (not shown), and the power unit and control (not shown) for driving the shaft 11 and chain drive 9 can be conventional and controlled for instance by an electric or magnetic sensor for sensing the presence of a section at the turnover device 6. If the sections 2 of a group are to be turned over individually an successively so that they rest on one of their flanges, and arm (say the arm 7) is raised to the position shown in FIG. 1. The front edge of the section 2 will engage under an edge 7a on the arm 7 and the other arm 8 is actuated so that its straight forward edge will tip the section 2 initially through about 90° and will push the section 2 over a hump 7b so that its apex slides into and rests in a recess 70c in the arm 7, while raising the section from the conveying plane of the chain conveyor 5. The arm 7 will then pass below the conveying plane of the chain conveyor 5 while the arm 8 moves to and then remains in the position previously occupied by the arm 7. The section 2 is thus turned through about 225° and rests with one of its flanges on the conveyor 5 (one such section is shown in FIG. 1). The rotation of the arm 7 continues until the arm 7 is in the position previously occupied by the arm 8. To be turned over, the next section 2 is tipped by the arm 7 over the edge 8a and moved over the hump 8b into the slotted recess 8c of the arm 8, which then releases the second section 2, turned-over, by passing below the conveying plane of the chain conveyor 5. Both arms 7, 8 therefore change their function with each operating cycle. If the sections 2 are not to be turned over, the arms 7, 8 are kept below the conveying plane of the conveyor 5.

A delivery pusher 13, which comprises a plurality of double-armed levers, is adapted to slide the sections 2 on to conveying means in the form of a third chain conveyor 14 at the same rate of operation as the turnover device 6, and the double-arm levers are non-rotationally mounted on a shaft 12 of a reversing pulley or sprocket at the end of the chain conveyor 5. The double-arm levers will be spaced along the length of the sections, as appropriate. The third chain conveyor 14 is initially driven in steps, for example by means of a stepping mechanism (not shown), and after taking each section 2, the conveyor 14 moves by just over one section width. As soon as a suitable number of sections have been formed into a group, the conveyor 14 is driven continuously and moves the group as far as a stop abutment 15 so that the group is positioned above a rise-and-fall table 16 and forms a layer ready for stacking. In each layer, all the sections are either turned over or not turned over, the turned over and not turned over layers alternating in the preferred arrangement. Although the turned over sections are initially resting on one flange, the top surface of the table 16 has profile shapes 16b which position the-turned-over sections correctly for the stacking operation. If the profile shapes 16b are sufficiently close together, the individual sections will touch, whereas if the profile shapes 16b are further apart, there will be a predetermined distance between the individual sections. As the group of sections 2 which have not been turned over must travel about half a section width more than the group of sections 2 which have been turned over, the stop 15 is movable by a mechanism (not shown) to position the respective groups approximately correctly over the top surface of the table 16. The table 16 is powered by a pressure fluid cylinder 16a and lifts the layer from the conveying plane of the chain conveyor 14. A stocking member or magnet head 17 of a magnet conveyor 18 is then lowered to the layer of sections on the table 16, raises the layer by means of magnet adhesion strips 17a and deposits the layer on a part-formed stack on a stacking table, in this case on a roller table 19. The spacing or pitch of the profile shapes of the strips 17a corresponds to that of the profile shapes 16b of the table 16. The vertical motion of the magnet head 17 is effected, for example, by a sliding support member 20 to which is secured one end of a chain 21. The chain 21 passes over reversing pulleys or sprockets 22, 23 and 25 and a driven chain sprocket 24. The sprocket 24 is connected to a reversible drive (not shown). A counterbalance weight 26 is mounted on the other end of the chain 21.

The translatory motion of the magnet conveyor 18 is for example a parallel arm motion accompanied by some vertical motion; the motion is effected by a rotary drive or crank arm 27 via a linkage 28 which moves a jointed parallel linkage. Comprising swinging arms 29, 30 movable about fixed axes 29a, 30a disposed below the conveying plane of the chain conveyor 14; when swung, the arms 29, 30 lift the layer of sections from the table 16 to deposit it on a part-formed stack on the stacking table 19. The drive arm 27, linkage 28 and parallel linkage 29, 30 are only shown schematically, but can be of conventional construction.

DESCRIPTION OF THE SECOND PREFERRED EMBODIMENT

Figure 2:
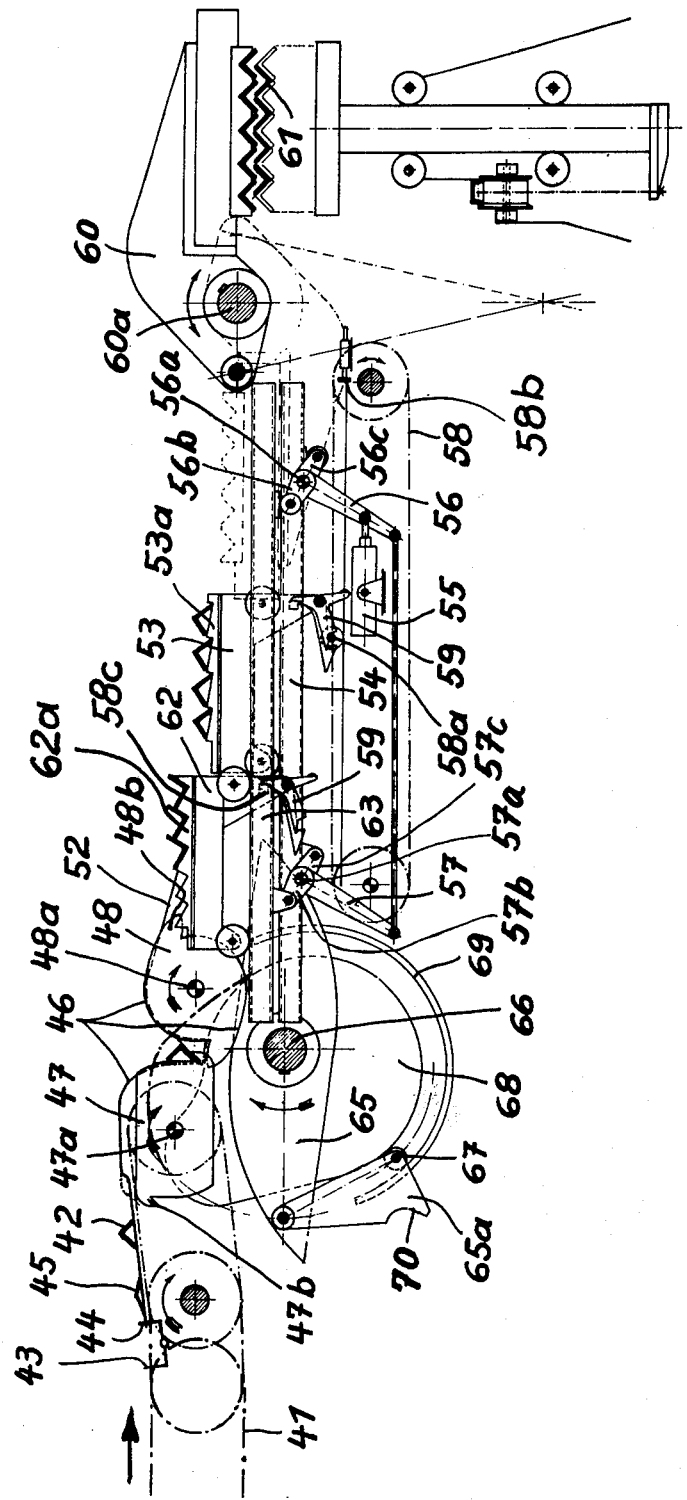
FIG. 2 is a side elevation of a second embodiment of the invention.
Figure 3:
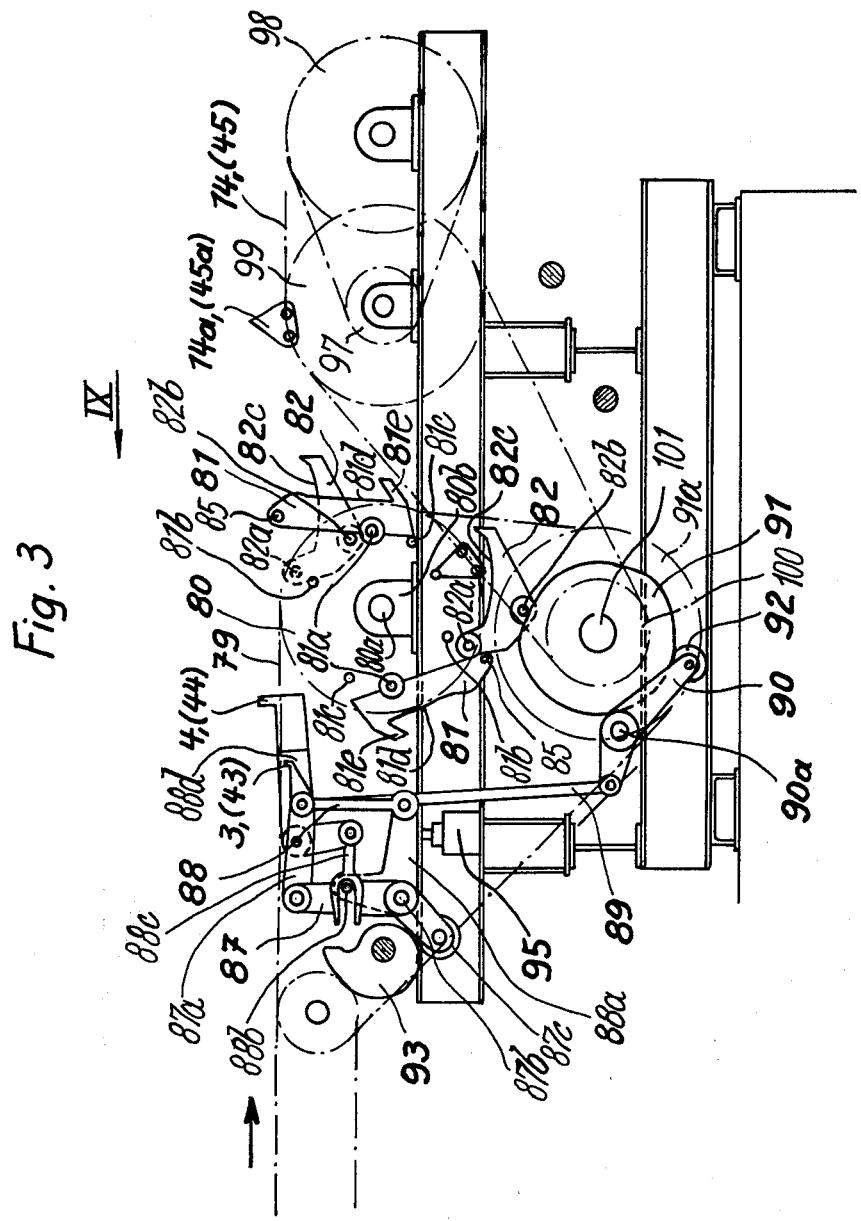
FIG. 3 is a side elevation of a third embodiment of the invention.
Figure 7:
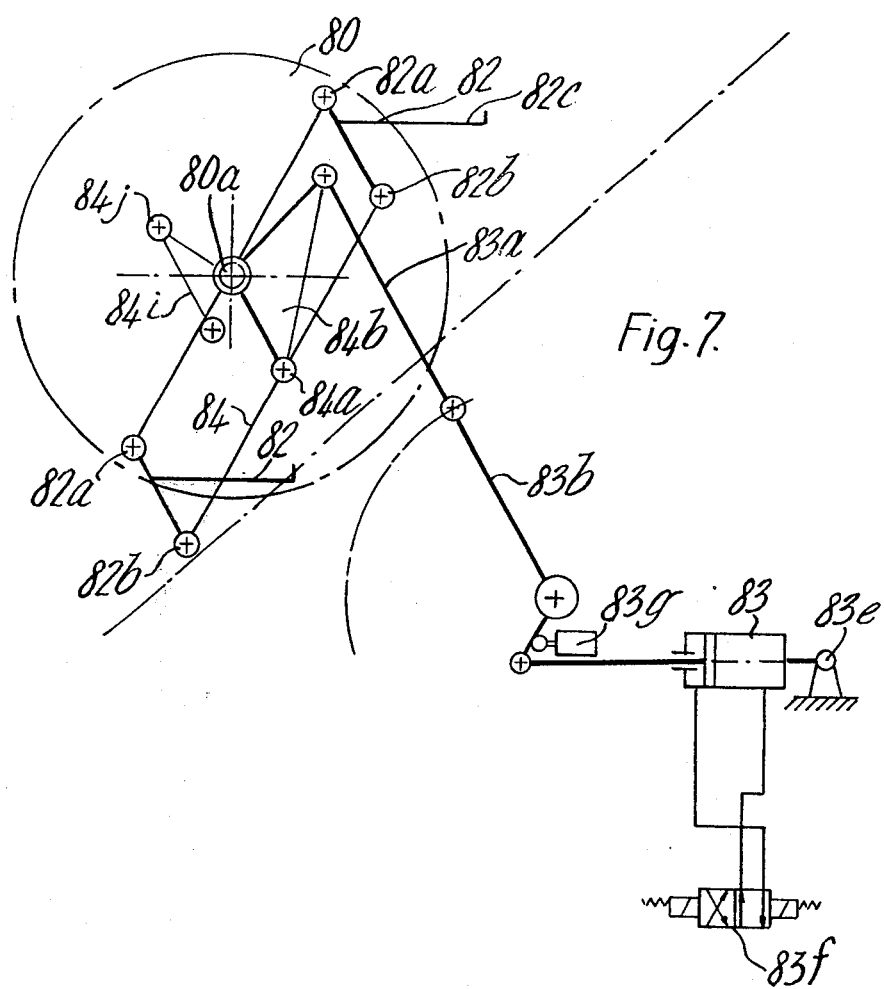
FIGS. 7 and 8 are schematic side elevations showing the operation of the turnover device of FIG. 3 when transferring without turning over.
Figure 8:
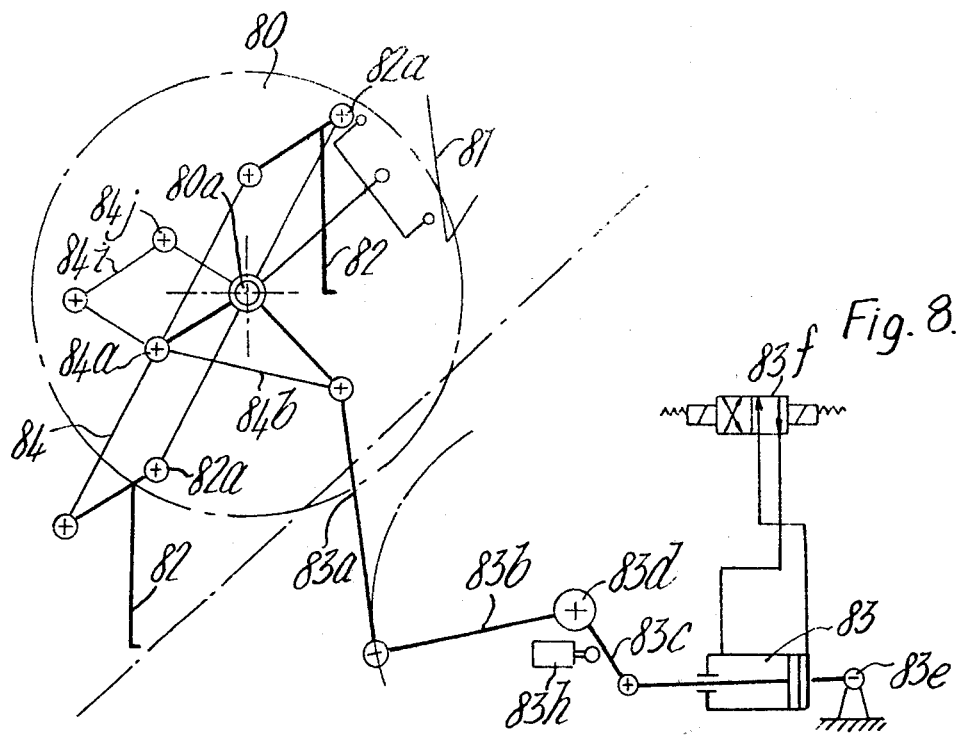
Figure 9:
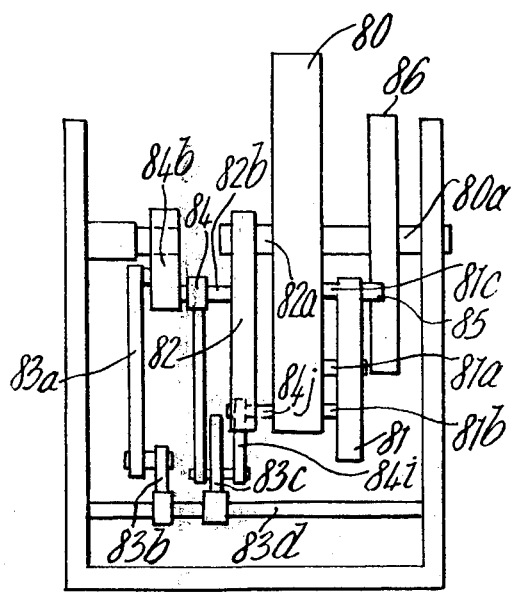
FIG. 9 is an end view of one disc of the turnover device, seen looking in the direction of the arrow IX in FIG. 3, the upper turnover lever and the upper retaining arm being omitted.

In the embodiment of FIG. 2, a chain conveyor 41 supplies sections 42. The sections 42 are transferred to a second chain conveyor 45 via an individualizing device which comprises two transverse stops in the form of fingers 43, 44 which are alternately raised and lowered into and out of the conveying plane; the second chain conveyor 45 has dogs 45a (as shown in FIG. 3) for engaging the sections, and supplies the sections 42 individually to a turnover device 46 at the same rate as that of the operation of the individualizing device, which rate is matched to the rate of operation of the turnover device 46.

The turnover device 46 for example comprises parallel sets of staggered turnover discs 47, 48 which are mounted on and driven by a set of coaxial shafts 47a and a set of coaxial shafts 48a and rotate intermittently in the direction indicated by the arrows, the shafts 47a, 48a being coupled so that the movements of the turnover discs 47, 48 are synchronized; each of the turnover discs 47, 48 has on its periphery two projections 47b, 48b which are at 180° relative to each other. The sets of discs 47, 48 will be spaced along the length of the sections, as appropriate. When the disc 47 has rotated somewhat from the position shown in FIG. 2 and its projection 47b is above the conveying plane of the second chain conveyor 45, each section 42 which is individually supplied to the chain conveyor 45 is pushed on to the top of the turnover discs 47 by the dogs 45a and engages in the notches in the respective projections 47b; the turnover discs 47 are then rotated and the dogs 45a keep the section 42 in engagement with the projections 47b as the section is swung over and lowered into the gap between the turnover discs 47, 48, the section 42 thus being turned through approximately 90°, as shown in FIG. 2. The projections 48b on the turnover discs 48 close the bottom of the gap between the turnover discs 47, 48 and the turnover discs 48 are now rotated so that the projections 48b (which are not the same shape as the projections 47b) engage the bottom of the section 42, lift the section out of engagement with the projections 47b and swing the section over onto a chute 52; the section 42 then slides down the chute 52 onto conveying means formed by parallel sets of staggered carriages 53, 62 which operate alternately. The sets of carriages 53, 62 are spaced along the length of the sections 42, as appropriate, connected so as to move together. The carriages 53 and 62 are shown by way of example as being wheel borne — however, they could be slide borne, sliding on suitable slideways corresponding to rails 54 and 63 which are referred to below. One carriage set 53, 62 at a time receives the sections 42, and the respective carriage set 53, 62 is advanced (in a manner described below) by one tooth pitch of saw-tooth shape section-retaining or take-up strips 53a or 62a after each section 42 is delivered to the carriage set. The retaining or take-up strips 53a and 62a interchangeable so that they can be changed with different strips when the apparatus is used for stacking sections of a different shape; the strips 53a and 62a which are shown in FIG. 2 position the sections so that they are parallel and spaced slightly apart, but if the strips 53a and 62a have a saw-tooth shape of slightly smaller tooth pitch, the sections would be touching. In FIG. 2, the carriages 62 are shown in a take-up position, receiving sections 42, while the carriages 53 are shown full. A number of the sections 42 is delivered to each carriage set until the carriage set is full, when the carriage set conveys the group so formed to a transfer device comprising swinging stacking members or magnet arms 60 driven by drive means comprising a shaft 60a and a conventional drive unit (not shown), where the group forms a layer ready for stacking. In each layer, all the sections are either turned over or not turned over, the turned over and unturned over layers alternating in the preferred arrangement, and the delivery of unturned layers is described in detail below. Thus, when the carriage set 53 is full, the carriage set 62, which moves on rails 63, is coupled by means of pawls 59 to driving dogs 58a of respective common, parallel, reversible drag chain 58 and is driven into a take-up position to the left (as seen in FIG. 2) of the loaded carriage set 53. At that position, the pawls 59 can either be detached from the driving dog 58a by means of a stop abutment 58c or can be automatically detached when the rails 63 of the carriages 62 are raised. The stop abutment may be a switch actuator for changing the direction of movement of the drag chain 58. The rails 63 are raised by a lifting linkage having a power unit 55 and parallel arms 56, 57 fixed to cross-shafts 56a, 57a to which are also fixed support arms 56b, 57b and 56c, 57c, the support arms being pivotally connected to the respective carriages 53, 62. The rails 54 of the carriage set 53 are simultaneously lowered.

In the meantime, the magnet arm 60 has been swung back about its drive shaft 60a into the position shown in broken lines, below the delivery plane. Lowering the rails 54 causes pawls 59 of the carriages 53 to engage the driving dogs 58a of the drag chain 58, and the drag chain 58 is reversed to move the carriages 53 over the lowered position of the magnet arm 60. In that position, the pawls 59 touch stop abutments 58b so that the pawls 59 and therefore the carriages 53 are uncoupled from the drag chain 58; alternatively, or in addition, the abutments 58b can be switch actuators for stopping the drag chain 58. When the magnet arm 60 is again swung up and over, it lifts the group of unturned sections 42 from the carriage 53, and deposits them on the previously delivered, turned-over layer of sections 42 on a conventional rise-and-fall stacking table 61. As soon as the magnet arm 60 lifts the sections off the carriages 53, an end switch (not shown) on the shaft 60a energises the drag chain 58 in the opposite direction and the carriages 53 are moved to their left hand (as seen in FIG. 2) end position.

Sections 42 which have not been turned over, are supplied if the turnover discs 47, 48 remain stationary and sets of parallel, double-arm rotary members 65 are driven by a shaft 66 and conventional drive means (not shown) in the direction indicated by the arrow. The sets of rotary members 65 are spaced along the length of the sections, as appropriate. Each member 65 has diametrically opposed delivery segments 65a (one of which is visible in FIG. 2) which have roller followers 67 bearing on the periphery of a stationary disc cam 68, and are pivoted to both free ends of the rotary member 65. At the lower part of the disc cam 68, the roller followers 67 are guided by a guide 69 to keep them close to the periphery of the disc cam 68. In the course of the motion of the rotary member 65, a single section 42 is placed in a recess 70 of a delivery segment 65a so that the section is lifted off the chain conveyor 45 and carried over to the chute 52. As soon as a group of unturned sections 42 is collected on one of the two carriage sets 53, 62, the carriages are moved as described above to the position in which the sections are removed by the magnet arm 60 while the other carriage set is moved back in to the take-up position in front of the chute 52.

The rotary member 65 is then stopped in the horizontal position and the turnover discs 47, 48 are restarted for turning over the next group of sections 42. Once started, the turnover discs 47, 48 rotate continuously at the same rate as the individualizing device.

The stepwise advance of the carriage sets 53, 62 can be controlled by a stepping mechanism fixed to the shaft 66 (if none of the sections 42 are being turned over) or by respective mechanisms fixed to the shaft 66 and to the shaft 47a or 48a (if alternate groups or layers of the sections 42 are being turned over). The carriage sets can be provided with conventional drives for this purpose. The length of each step can be adjustable, to permit precise positioning of the carriage sets 53, 62 at each step in accordance with the tooth pitch of the strips 53a and 62a. When the respective carriage set reaches the end of its advance, the stepping mechanism actuates the power unit 55 to lower the respective carriage set.

DESCRIPTION OF THE THIRD PREFERRED EMBODIMENT

FIGS. 3 to 9 show a third embodiment of a turnover device, and also show details of an individualizing device.

Sets of parallel rotary members in the form of discs 80 rotate about a shaft or set of coaxial shafts 80a in synchronism with a chain conveyor 79 at the same rate as an individualizing device 3, 4 or 43, 44 upstream of the discs 80; the discs 80 are spaced along the length of the sections 2 or 42. Each disc 80 has on its periphery hook-shaped turning means or levers 81 and pocket-shaped retaining or pass-over arms 82, pivoted to the disc 80 about respective axes 81a and 82a, the pivot axes 81a of each lever 81 being 180° from the pivot axis 81a of the other lever 81 and the pivot axis 82a of each arm 82 being 180° from the pivot axes 82a of the other arm 82. The levers 81 are for turning over the sections 2 or 42, the retaining arms 82 being pivoted inwards at the top of the disc 80 (as described below) so as not to interfere with the action of the levers 81. The levers 81 have a restricted pivotal motion (relative to the respective disc 80) between two stops 81b and 81c, as illustrated more clearly in FIG. 4. As each lever 81 rises up the left-hand side (as shown in FIG. 3) of the axis of the disc 80, it will tip back against the stop 81b; as shown in FIG. 4, the motion of the lever 81 is guided by a roller 85 on the lever 81 which engages a guide 86 (see FIGS. 4 and 9) in order to ensure that the lever 8a moves correctly — the guide 86 is remote from the discharge side of the turnover device and extends generally parallel to the periphery of the disc 80. When the lever 81 reaches the conveying plane of the chain conveyor 79, its section-receiving part 81d will be approximately horizontal, as is shown in FIG. 4. As soon as the lever 81 reaches the conveying plane of the chain conveyor 79, a section 2 or 42 is passed onto the section-receiving part 81d, the movement of the individualizing device (3, 4 or 43, 44) being synchronized with the rotation of the discs 80 so that the center of gravity of the lever 81 with the section 2 or 42 upon it is ahead of the pivot axis 81a of the lever 81. The lever then tips forward until it abuts its stop 81c, and at the same time is tilted forward by the continuing motion of the disc 80; a guide (not shown) similar to the guide 86 (shown in FIG. 4) can if necessary be provided for engagement by the roller 85 and ensuring that the lever 81 moves correctly. The section 2 or 42 slides forward until its forward edge engages under a hook 81e on the lever 81, where it is securely held. Finally, dogs 14a or 45a of a second chain conveyor 14 or 45 pick up the section 2 or 42 from the levers 81 and carry it to a downstream collecting station. The second chain conveyor 14 or 45 moves in the opposite direction to the disc 80 in the zone where the dogs 14a or 45a pick up the sections 2 or 42, and this zone is roughly at the same height as the axis of rotation of the disc 80.

If the sections 2 or 42 delivered by the individualizing device are to be transferred without being turned over, the retaining arms 82 will be pivoted outwards at the top of the disc 80. The motion of the retaining arms 82 is controlled by a lever system and a hydraulic actuator 83 (see FIGS. 7 and 8). The retaining arms 82 are interconnected by a T-Shaped connecting rod 84 pivoted to the arms at 82b, thereby forming a parallel linkage. The connecting rod 84 rotates in turn about an axis 84a which is fixed in one of two different positions, illustrated in FIGS. 7 and 8 respectively. The axis 84a is the axis of pivoting to a coaxial member or bell-crank 84b which is in turn pivotally mounted about the axis of the shaft 80a of the disc 80 and is connected by a connecting rod, two levers 83b and 83c and a shaft 83a 83d (see FIGS. 6 and 9) to the hydraulic actuator 83, the levers 83b and 83c both being fixed to the shaft 83 d; the actuator 83 is pivotally mounted at 83e, is controlled by a hydraulic valve 83f and is associated with a limit switches 83g and 83h (see FIGS. 7 and 8). The side-arm of the T-shaped connecting rod 84 is connected by a pivoted link 84i to a pivot axis 84j on the disc 80, to maintain the correct position of the connecting rod 84.

Figure 13:
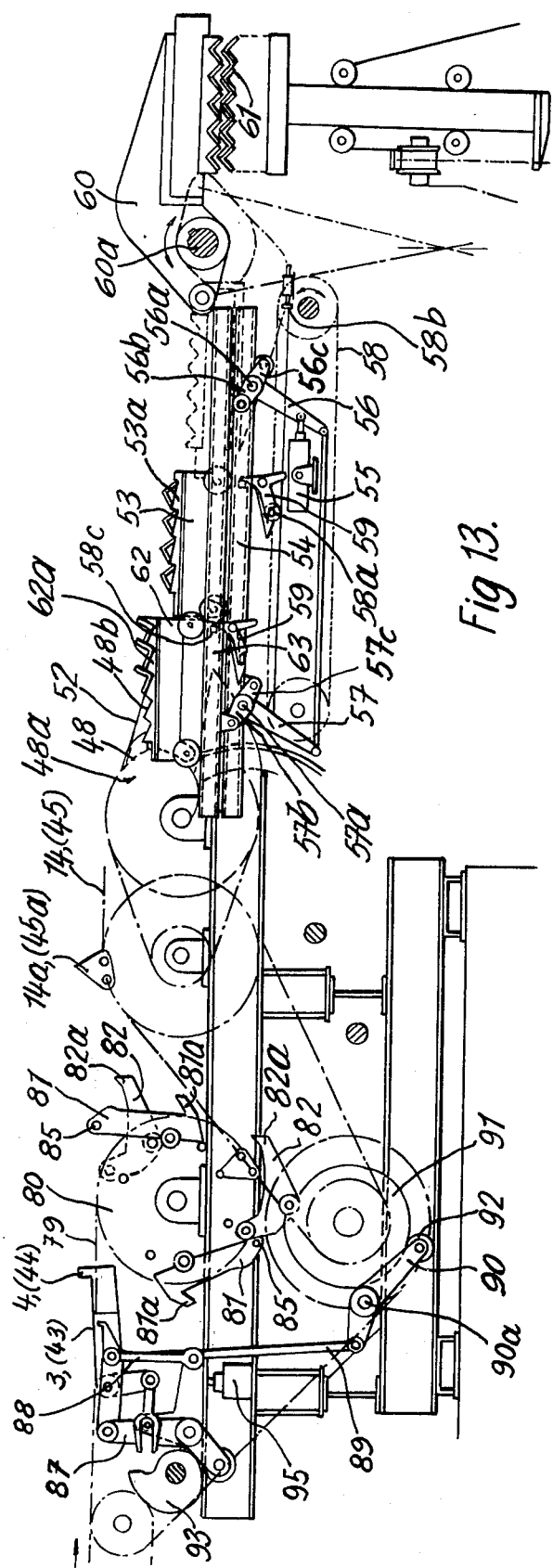
FIG. 13 is a side elevation of a fourth embodiment of the invention.

When the arms 82 are pivoted outwards at the top of the disc 80 (as in FIG. 7), the lever system will keep the section-receiving parts 82b of the arms 82 approximately horizontal. When a respective arm 82 reaches the conveying plane of the conveyor 79, a section 2 or 42 will be delivered onto the part 82c and subsequently in the course of the rotary motion of the disc 80, the section 2 or 42 will be placed unturned on the chain conveyor 14 or 45 and conveyed by means of the dogs 14a or 45a to a downstream collecting station. The groups of sections 2 or 42 can be collected and stacked as described with reference to FIG. 1 or FIG. 2. FIG. 13 illustrates collection and stacking as described with reference to FIG. 2, the right-hand side of FIG. 13 reproducing the respective part of FIG. 2 and being referenced with the same references, and the left-hand side of FIG. 13 reproducing FIG. 3 and being referenced with the same references.

FIG. 3 also illustrates an embodiment of the individualizing device 6 or 46 which is indicated in FIGS. 1 and 2 by the fingers 3, 4 or 43, 44. These are sets of fingers 3, 4 or 43, 44, spaced along the length of the sections and connected so as to move together. As shown in FIG. 3, each finger 3, 43 is carried by a lever 87a pivotally mounted on one arm of an obtuse angled, double-arm lever 87 and is also pivotally coupled to an intermediate or bell crank lever 88a via connecting means in the form of a connecting rod 88; the double arm lever 87 and the bell crank lever 88a are both pivotally mounted for movement about a fixed axis 87b, and the upper end of the bell crank lever 88a carries an abutment pin 88b which engages in an abutment fork in the end of connecting means in the form of a push rod 88c, thereby forming a last-motion drive; the push rod 88c is pivoted to one arm of an L lever 88d which carries the finger 4 or 44, the weight of the L lever 88d biasing the abutment fork against the abutment pin 88b. The fingers 3, 4 or 43, 44 are alternately raised above or lowered below the conveying plane of the chain conveyor 79 by means of drive means comprising a lifting linkage 89 and a double lever 90, pivotally mounted for movement about a fixed axis 90a; a roller 92, bearing on the periphery of a rotary disc cam 91, is rotatably mounted on the free end of the double lever 90. The disc cam 91 is driven at the conveying speed of the chain conveyor 79 (as described below) and, as it rotates, causes the double lever 90 to oscillate, thereby reciprocating the connecting rod 89, oscillating the L-shaped lever 88d and moving the finger 4 or 44 up and down; the oscillation of the L-shaped lever 88d is transmitted to the lever 87a via the push rod 88c, the crank lever 88a and the connecting rod 88 so that the finger 3 or 4 moves up and down approximately 180° out of phase with the finger 4 or 44. In this manner, the sections 2 or 42 are spaced out or individualized always at the same intervals, whatever the speed of the conveyor 79. The fingers 3, 4 or 43, 44 function as blocking means through which individual sections 2 or 42 may pass at the rate at which the individualizing device operates. The lower end of the double arm lever 87 carries a roller 87c which engages the periphery of a disc cam 93; adjustment of the angular position of the disc cam 93 moves the axis about which the lever 87a pivots and thus adjusts the distance between the fingers 3 or 43 and 4 or 44. The finger 3 or 43 may also be fixed in the upper position by means of a power unit 95, to act as a fixed blocking means. A sensing means (not shown) such as an electric eye, can be provided to detect misplaced sections downstream of the individualizing device and to control the fixed blocking means, and/or the fixed blocking means can be controlled by an interlock system associated with the stacking device or even the turnover device or assembling means (the conveyor 14 or 45).

The conveyor 14 or 45 is in two parts and is driven by a motor 97, which drives a set of end sprocket wheels 98. The conveyor chains of the downstream part of the conveyor 14 or 45 drive a set of intermediate sprocket wheels 99 which in turn drive the conveyor chain of the upstream part of the conveyor 14 or 42 and a set of end sprocket wheels 100. The end sprocket wheels 100 are fixed to a shaft 101 to which are also fixed the disc cam 91 and a set of end sprocket wheels of the conveyor 79. The conveyor chains of the conveyor 79 pass over sprocket wheels rotationally fixed to or forming part of the discs 80.

The invention is not only confined to the embodiments illustrated in FIGS. 1 to 3 but also comprises any desired combination of the components illustrated therein to provide a fully mechanised individualizing, turnover and stacking apparatus.

To permit different kinds of stack formation, it is possible for the interchangeable take-up strips on the carriages and on the magnet conveyors to have a pitch which is greater than that of the section width so that it is also possible, as illustrated in FIGS. 10 and 11, to stack the sections 2 or 42 into individual columns or, as illustrated in FIG. 12, to nest the sections 2 or 42 of the entire stack into each other. Such a system also permits the stacking of unequal angle sections (angle sections having flanges of different lengths), as shown in FIG. 10; the sections can be of any suitable shape, and apart from those illustrated, I sections can for instance be stacked in individual columns or nested into each other. Preferably, the sections are stacked with alternate layers turned over and unturned. However, this is not essential (e.g. with I sections), and a stack could be formed with all the layers turned over or unturned; nonetheless, the incorporation of the turnover means is advantageous even when the sections are not turned over because the apparatus has flexibility and can also be used for methods requiring the sections to be turned over.

As shown in FIGS. 10, 11 and 12, the sections are preferably stacked with the sections in each layer spaced apart, i.e. with a predetermined distance between the sections in each said group, but this is not essential. If desired, the sections in each layer can be touching.

The stepped control of the stepped movement of the chain conveyors 14 or 45 and carriages 53 and 62 can be controlled by a rotating disc cam which may be coupled to a main drive through a steplessly variable linkage in such a way that the disc cam performs one complete revolution for each feed stop. A stepping mechanism would achieve the same purpose and one is referred to above in the description of the embodiment of FIG. 3. The drives of the individualizing devices and of the turnover devices and of the turnover devices are continuously in motion. Assembling the sections into groups and transferring them to the stacking tables is performed automatically for each group, for example by means of limit switches, sensors and counting mechanisms for counting the number of sections.

The carriages 53 and 62 of the second embodiment (FIG. 2) could be coupled and uncoupled from the drag chain by the action of lowering or raising the respective carriage, i.e. by the action of lowering or raising the rails 54 or 63.

I claim:

1. Apparatus for mechanically stacking sections in layers, which sections are delivered transversely to their length, the apparatus comprising:

at least one conveyor for conveying sections transversely to their length, means for separating the individual sections from one another, a rotary member, after the separating means, for turning the individual sections over, at will, turning means on the rotary member, the turning means defining a section-engaging and retaining recess, for receiving successive sections from the conveyor and turning the respective sections about their longitudinal axes as the section is carried around the rotary member, means for rotating the rotary member, a second conveyor disposed at the delivery side of the rotary member for receiving the sections from the turning means, the second conveyor having projecting dogs for engaging the sections and removing them from the turning means, means for driving the second conveyor such that the portion of the conveyor adjacent to the rotary member moves in the opposite direction to the adjacent portion of the rotary member, at least one pass-over means on the rotary member for lifting sections above the turning means and thereby preventing delivery of the sections to the recess of the turning means, and for conveying the sections unturned to the second conveyor, actuating means for moving the pass-over means from an inoperative position in which the pass-over means allows the sections to be delivered to the recess of the turning means to an operative position in which the pass-over means prevents delivery of the sections to the recess of the turning means, means for assembling the sections individually and successively into groups of parallel sections, the section in each group either touching or there being a predetermined distance between the individual sections, a stacking table, and a single stacking device for stacking the respective groups of sections on the stacking table.

2. Apparatus according to claim 1, wherein said portion of the second conveyor rises at approximately 45° to the horizontal and the sections are carried by the turning means or by the pass-over means through at least about 90° of the rotation of the rotary member before being engaged by the projecting dogs of the second conveyor.

3. Apparatus according to claim 1, wherein the turning means comprises at least one pivoted lever which pivots forwards when the respective section engages in the retaining recess thereof.

4. Apparatus according to claim 1, wherein the pass-over means comprise at least one pivoted arm defining a surface for receiving the respective sections off the first conveyor, and means for constraining the section-receiving surface to remain generally horizontal when the pass-over means is in said operative position, from the position in which the pass-over means receives the respective sections from the first conveyor to the position in which the respective sections are engaged by the projecting dogs of the second conveyor.

5. Apparatus according to claim 4, wherein said constraining means comprises a parallel linkage means in turn comprising two members pivoted to the respective pass-over arm about spaced first and second pivot axes and pivoted to a control member about spaced third and fourth pivot axes, the first to fourth pivot axes forming a parallelogram, and wherein said actuating means comprises means for moving the control member from a first position in which the pass-over means in in an inoperative position to a second position in which the pass-over means is in an operative position.

6. Apparatus for mechanically stacking sections in layers, which sections are delivered transversely to their length, the apparatus comprising:
- at least one conveyor for conveying sections transversely to their length,
- two stops for separating the individual sections from one another, the stops being spaced apart whereby one, first stop is downstream of the other, second stop in the path of the sections,
- a first pivoted lever mounting the first stop for up and down motion into and out of the path of the sections,
- a second pivoted lever mounting the second stop for up and down motion into and out of the path of the sections,
- drive means for oscillating one of the stop-mounting levers to move the respective stop up and down,
- an intermediate pivoted lever,
- first connecting means operatively connecting said one stop-mounting lever to the intermediate lever for oscillating the intermediate lever approximately 180° out of phase with said one stop-mounting lever,
- second connecting means for operatively connecting the intermediate lever to the other stop-mounting lever for oscillating said other stop-mounting lever approximately in phase with the intermediate lever,
- turnover means, after the separating means, for turning the individual sections over, at will,
- means for assembling the sections individually and successively into groups of parallel sections, the sections in each group either touching or there being a predetermined distance between the individual sections,
- a stacking table, and
- a single stacking device for stacking the respective groups of sections on the stacking table.

7. Apparatus according to claim 6, wherein said first connecting means comprises a lost-motion drive in turn comprising an abutment driven by said one stop-mounting lever and an abutment driving the intermediate lever, and the apparatus comprising means biasing said other stop-mounting lever into a position in which the respective stop is lowered out of the path of the sections, which biasing means holds said abutments in engagement for drive transmission from said one stop-mounting lever to the intermediate lever, the apparatus further comprising actuating means for holding one of the stops stationary in the path of the sections, the actuating means comprising a member for holding the intermediate lever in a position in which said abutments are not in engagement.

8. The apparatus of claim 6, wherein the assembling means comprises two carriages downstream of the turnover means, for receiving the sections, guide rails for guiding the carriages, means for moving the carriages out of phase with each other, and for moving each carriage initially in steps to form said group and thereafter continuously to carry the group forwards, and means for alternately raising and lowering the guide rails.

9. Apparatus for mechanically stacking sections in layers, which sections are delivered transversely to their length, the apparatus comprising:
- at least one conveyor for conveying sections transversely to their length,
- means for separating the individual sections from one another,
- turnover means, after the separating means, for turning the individual sections over, at will,
- the turnover means comprising a rotary disc, at least one lever with a retaining recess pivotally mounted on the disc and adjacent the periphery thereof for turning the sections about their longitudinal axes, at least one retaining arm pivotally mounted on the disc and adjacent the periphery thereof for preventing delivery of the sections to the lever and carrying the sections over the disc without substantially turning them about their longitudinal axes, means for pivoting the retaining arm inwardly and outwardly with respect to the periphery of the disc, and means for rotating the disc,
- means for assembling the sections individually and successively into groups of parallel sections, the sections in each group either touching or there being a predetermined distance between the individual sections,
- the assembling means comprising a conveyor disposed at the delivery side of the disc and having projecting dogs for engaging the sections and removing them from the disc, and means for driving the conveyor such that the portion of the conveyor adjacent to the disc moves in the opposite direction to the adjacent portion of the disc,
- a stacking table, and
- a single stacking device for stacking the respective groups of sections on the stacking table.

* * * * *